Patented Sept. 2, 1941

2,254,212

UNITED STATES PATENT OFFICE 2,254,212

CATALYST AND PROCESS FOR PRODUCING VINYL ACETATE AND ETHYLIDENE DIACETATE

Joseph G. Dinwiddie, Waynesboro, Va., assignor to E. I. du Pont de Nemours & Company, Wilmington, Del., a corporation of Delaware No Drawing. Application March 1, 1939, Serial No. 259,233

11 Claims. (Cl. 260—498)

This invention relates to the manufacture of vinyl and ethylidene esters, and more particularly, to catalyzing the addition reaction between acetylene and carboxylic acids. It especially appertains to catalytically promoting an absorption interaction of acetylene and a liquid aliphatic carboxylic acid.

It is known that acetylene will combine with carboxylic acids in the presence of a catalyst to form vinyl esters and ethylidene esters. In equation form the interaction may be represented simply as the addition of one or two mols of the carboxylic acid to one mol of acetylene. In the case of acetic acid the course of the reaction is conveniently illustrated as a two-step process by the equations:

(1)

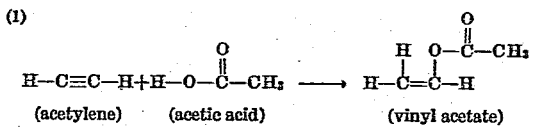

(acetylene)   (acetic acid)        (vinyl acetate)

(2)

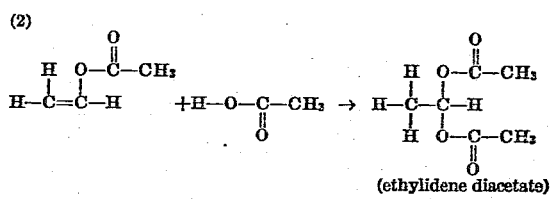

(ethylidene diacetate)

These reactions proceed slowly if at all, in the absence of catalysts. Both reactions occur simultaneously to a greater or lesser extent, depending generally upon the conditions, particularly temperature.

Because of the technical importance of these reactions, many investigators have directed their attention to the search for catalysts for the same. In spite of an immense amount of research work, no catalyst entirely satisfactory for promoting the absorption interaction has been announced.

This invention had for an object the preparation of a more powerful catalyst for promoting the absorption interaction of acetylene and liquid aliphatic carboxylic acids to form vinyl and/or ethylidene esters. Another object was to devise means for controlling to a certain extent the relative proportions in which vinyl and ethylidene esters are formed, particularly by suitably adjusting the proportion of the new catalytic ingredient present in the catalyst composition for the absorption interaction of acetylene and carboxylic acids. Other objects were, to prepare a catalyst particularly favoring the predominant formation of vinyl esters in the reaction between acetylene and aliphatic acids, to conduct the absorption interaction between the acetylene and acetic acid in the presence of a catalytic composition comprising an organic trisulfonic acid and a mercury salt, to form vinyl and ethylidene acetates more rapidly and in greater yields than was heretofore possible, to form vinyl and ethylidene acetates with smaller amounts of catalyst compositions than was heretofore possible, to reduce the amount of tar formed in the preparation of vinyl and ethylidene acetates from acetylene, to catalyze the formation of vinyl acetate and ethylidene acetate by use of a mercury salt and a practically pure methane trisulfonic acid, to catalyze the formation of vinyl acetate and ethylidene acetate by use of a mercury salt and a sulfonic acid mixture containing substantial amounts of methane trisulfonic acid, to catalyze the formation of vinyl acetate and ethylidene acetate by means of a sulfonic acid mixture containing substantial amounts of methane trisulfonic and monosulfoacetic acids together with a mercury salt and some methionic acid, to prepare a catalyst for the formation of esters from acetylene and liquid carboxylic acids from mercury compounds and methane trisulfonic acid containing sulfonic acid mixtures, to combine a mercury salt and methane trisulfonic acid together with other sulfonic acids as a catalyst composition for the simultaneous production of vinyl acetate and ethylidene diacetate in predetermined proportions, and to convert the vinyl acetate in an absorption mixture largely to ethylidene diacetate at the end of the absorption by increasing the temperature. A general advance in the art, and other objects which will appear hereinafter, were also contemplated.

It has been found that a practically pure organic trisulfonic acid in combination with a physically reactive mercury salt is particularly efficient for the production of vinyl and/or ethylidene esters of carboxylic acids in the absorption interaction of acetylene and liquid aliphatic carboxylic acids.

It has also been found that such a mixture, that is, a mixture containing an organic trisulfonic acid, may be prepared by reacting sulfur trioxide in chemical or stoichiometric excess upon a liquid organic acid (or anhydride). It has also been found that a similar mixture can be prepared by reacting fuming sulfuric acid in chemical excess with an acid anhydride. The employment of such a combination of catalytic materials to produce vinyl esters and ethylidene esters constitutes a preferred embodiment of the invention for various, particularly economic, reasons.

In a specific embodiment of the present invention in which a preponderance of ethylidene diacetate is a desideratum, acetylene is introduced into a suitable absorption vessel containing a large amount of acetic acid, a small quantity of acetic anhydride (to maintain anhydrous conditions), 0.10%–1% of a mercury salt (calculated as mercuric oxide), and 0.10%–1% of a sulfonic acid mixture of which at least about 12%–20% is methane trisulfonic acid. The amount of acetic anhydride should be small enough not to seriously dilute the catalyst, but should be great enough to ensure the presence of a slight amount of unreacted anhydride at the end of the process. If, as in the case of mercuric sulfate, the mercury salt is one that remains undissolved in the reaction liquid, it should be finely divided, crystalline, and of a highly reactive nature. Continuous agitation during the absorption and maintenance of a temperature between 50° and 105° C. have been found especially desirable. When the rate of absorption of acetylene falls off sharply, the passage of acetylene is discontinued, and after a short resting period, the reaction is considered to be complete.

From the following description and specific examples, in which are disclosed certain embodiments of the invention as well as details of what is believed to be the best mode for carrying out the invention, it will be apparent to others skilled in the art to which this invention most nearly appertains how the foregoing objects and related ends are accomplished, and as a result, they will be enabled to carry out the same. The quantities are given in parts by weight throughout the application.

PREPARATION OF METHANE TRISULFONIC ACID

Example I

A sulfonic acid mixture containing a large amount of methane trisulfonic acid was treated with ammonium acetate. After some time the ammonium salt of methane trisulfonic acid precipitated out, and after filtering off the mother liquid, it was converted to the free methane trisulfonic acid by treatment with aqua regia. The free acid has a melting point of approximately 150°–153° C.

Example II

To 400 parts of acetic anhydride (material having a strength of at least 95% is preferred) there was added 1070 parts of 65% oleum. The rate of addition was sufficiently slow so that a gradual rise in temperature took place, 115° C. being reached by the time about 450 parts of the oleum had been added. Upon completion of the addition of the oleum the temperature had reached 120° C. This temperature was maintained for about three hours, after which time the reaction was substantially complete. Glacial acetic acid (500 parts) was added next, and the temperature kept at 120° C. for an additional three hours. Finally 3,000 parts more of glacial acetic acid was added and the mixture was agitated for approximately thirty minutes. Experience indicates that at least thirty minutes' agitation is desirable at this stage of the process. The final mixture contained about 35% of sulfonic acids (calculated as mono-sulfoacetic acid). Of this, 15% was methane trisulfonic acid, 62% sulfoacetic acid, and the remaining 23% methionic (methane disulfonic) and other sulfonic acids. The preferred ranges for the components of such compositions are 5%–30% methane trisulfonic acid, 10%–30% methane disulfonic acid and 40%–65% sulfoacetic acid.

Example III

Two hundred and seventy-one (271) parts of sulfur trioxide (obtained by the distillation of oleum) was introduced into 102 parts of glacial acetic acid at such a rate that the gas was absorbed quite completely by the acid. During the absorption the temperature was maintained at 90°–135° C.

In the preparation of the methane trisulfonic acid and its admixtures, the amount of reagents and temperatures may be varied fairly widely, as will be clear from the preceding examples. It is preferred that the admixtures contain at least 12% methane trisulfonic acid, and for this reason it is advantageous to carry out the preparation at a temperature of 100°–120° C. It is important to have present sufficient acetic anhydride to substantially offset any water originally present or added during the preparation. Generally the amount of oleum or sulfur trioxide added is in excess of that theoretically chemically equivalent to the acetic anhydride or the acetic acid employed. Experience indicates that 1.5 parts of sulfur trioxide for each part of acetic anhydride or glacial acetic acid will be satisfactory for commercial scale operation if the heating is carried out at about 90°–135° C. for a period of time sufficient to insure the presence of at least 15% methane trisulfonic acid. With process refinements or the employment of super-atmospheric pressure and temperatures, it will probably be possible to employ a smaller proportion of sulfur trioxide. At present there appear to be definite advantages in the operation of an atmospheric pressure process.

PREPARATION OF ESTERS

Example IV

In a suitable glass-lined reaction vessel there was placed acetic acid (5,500 parts), acetic anhydride (100 parts) and methane trisulfonic acid prepared as described in Example I (10 parts). Thereafter mercuric sulfate (30 parts) was added and acetylene passed into the mixture while maintaining a temperature of 65°–90° C. and keeping the reaction mixture well agitated. The vinyl acetate was removed as fast as formed by circulating the acetylene and other vapors through a condenser which separated the vinyl acetate and some acetic acid. The vinyl acetate was then purified. Surprisingly little tar was formed, and the production of the vinyl acetate proceeded smoothly and rapidly. Good yields of vinyl acetate and ethylidene diacetate were obtained.

Equally good results were obtained in a similar procedure in which 15 parts of mercuric sulfate and 5 parts of mercuric oxide were substituted for the 30 parts of mercuric sulfate mentioned above.

Comparable results were also obtained when the methane trisulfonic acid was dissolved in about half its weight of water and added to the reaction mixture as a solution.

Example V

Into a suitable container (glass-lined equipment) there was introduced with agitation 38 parts of a methane trisulfonic acid mixture prepared as described in Example II, 21 parts of finely divided crystalline reactive mercuric sulfate, 14 parts of mercuric oxide and 5600 parts of glacial acetic acid. The glacial acetic acid contained sufficient acetic anhydride to render the mixture anhydrous throughout the process. While maintaining a temperature of about 80°–100° C. acetylene was passed into the reaction mixture as rapidly as it was absorved, and the passage of acetylene continued until a sharp drop in the rate of absorption was observed. The mixture was then permitted to stand for a few minutes in order to allow completion of the reaction. The percent of ethylidene diacetate in the absorber liquor at the end of the absorption was 89% (based upon the amount of acetic acid employed). The ethylidene diacetate was recovered and purified. In the interest of brevity a detailed description of the purification process for this material is omitted. Various procedures for this purpose are well known. The usual and well known recovery procedures are especially applicable to the reaction mass of the present invention, since there are less sulfonic acids and less tar in the mixture. This facilitates the recovery of the desired product.

EXAMPLE VI

In a stainless steel container there was introduced with agitation 38 parts of a methane trisulfonic acid mixture prepared according to the procedure set out in Example II, 21 parts of finely divided crystalline reactive mercuric sulfate, 14 parts of mercuric oxide and 5600 parts of glacial acetic acid containing slightly more than sufficient acetic anhydride to combine with any water present or formed during the reaction. In this case there was 1 to 3% acetic anhydride remaining at the end of the absorption. The temperature of the mixture was brought to about 70°–75° C. and acetylene introduced at a rate slightly in excess of the rate at which it was absorbed. Suitable auxiliary equipment including piping, towers, condensers, etc., was provided in connection with the reaction vessel. Excess unabsorbed acetylene together with vinyl acetate and small amounts of other volatile substances were circulated through the auxiliary system. During this circulation the vinyl acetate and other readily condensable substances were removed and the excess acetylene recirculated through the reaction container. Acetic acid was added from time to time to replace that removed in the vapor. Toward the end of the absorption reaction the temperature of the mixture was raised to about 90° C. The range 90°–95° C. is very satisfactory. This temperature increase has been found to increase the yield of ethylidene diacetate by converting the remaining vinyl acetate to ethylidene diacetate. When the rate of absorption of acetylene had markedly diminished, the passage of acetylene into the absorption container was terminated, and after an interval of some minutes the absorption was considered to be complete. A yield of 1800 parts of vinyl acetate was obtained and the residue contained 80%–90% of its weight of ethylidene diacetate.

The absorption reaction may be performed at any desired pressure. While pressures near normal are preferred, substantial super-and subatmospheric pressures are practical and satisfactory.

Other organic trisulfonic acids, for example, ethane trisulfonic acid and the various isomeric propane trisulfonic acids, may replace the methane trisulfonic acid used for the purpose of specific illustrations in the examples. The choice of the trisulfonic acid or mixture containing the same depends upon the equipment and materials available and the results desired.

The catalysts of this invention are useful in the manufacture of vinyl and ethylidene esters other than those mentioned specifically above, such as, for example, vinyl propionate, vinyl butyrate, ethylidene dipropionate and ethylidene dibutyrate.

One of the main objectives of the present invention is to increase the amounts of vinyl esters and/or ethylidene esters formed in the interaction of acetylene and the liquid aliphatic carboxylic acid with the use of as little of the active catalyst as possible.

A mixture, as made commercially and described under Example II, containing considerable methane trisulfonic acid together with monosulfonic acid and possibly the disulfoacid (methionic), has been found to be quite efficient for making the vinyl esters and/or ethylidene esters of the carboxylic acids. The proportion of each that is actually separated is largely dependent on the temperature of the reaction mixture and the amount of vapors drawn off through the condenser.

The practically pure crystallized methane trisulfonic acid alone is very efficient as a catalyst for the vinyl esters and/or ethylidene esters.

It is to be understood, of course, that a suitable synergic or auxiliary mercury salt catalyst (such as those well known in the art) is always present in the catalysts of the present invention.

It is important that the mercury salt be soluble in the reaction mixture (liquid), or, if insoluble, that it be in a finely divided crystalline reactive (freshly prepared, for example) state that is readily suspendable in the reaction mixture. Although there are many suitable mercuric salts, the preferred ones are mercuric acetate (or its equivalent, i. e., materials capable of forming mercuric acetate), mercuric oxide, mercuric acetyl sulfate, mercuric methionate and mercuric methane trisulfonate. The mercury salts such as mercuric methane trisulfonate may be prepared by the reaction of mercuric oxide or the like with the appropriate acid and added as such to the reaction mixture, or they may be formed in situ in the absorption container. Operation with a mercury salt (such as mercuric sulfate) which is insoluble in the reaction mixture is particularly effective inasmuch as the mercury salt apparently is only slowly used up and may be advantageously present in excess over that theoretically required to combine chemically with the sulfonic acids. While perhaps less advantageous, the invention is operable if the mercury salt is present in an amount less than the equivalent to that theoretically required to combine chemically with the sulfonic acids.

It is important to regulate the temperature of the absorption reaction in order to control the relative amounts of vinyl and ethylidene esters formed. Thus, if it is desired to form vinyl esters predominantly, methane trisulfonic acid alone, or a commercial mixture which contains some mono- and di-sulfonic acids, is used with a suitable mercury salt, and the temperature of the absorption reaction is maintained at about 40°–70° C. On the other hand, if it is desired to form etylidene esters predominantly, the same sulfonic acids are employed together with a suitable mercury salt and the temperature of the absorption reaction is kept at about 80°–110° C. This range is somewhat below the boiling point of the reaction mixture. Preferably the absorption is carried out within these aforementioned limits (40°–110° C.).

The production of vinyl and ethylidene esters in a continuous manner is sometimes desirable. In such a case it has been found advantageous to employ a mixture of sulfonic acids containing methane trisulfonic acid and a suitable mercury salt, and to operate at a temperature of 70°–85° C. until the rate of absorption of acetylene markedly diminishes. Throughout this operation the acetylene is introduced at such a rate that a current of excess acetylene assists in removing the vinyl esters from the absorption container to an auxiliary system, where the excess acetylene is separated (by removal of the condensable materials including the vinyl esters) and is circulated back to the absorption container.

Theoretically 1.33 parts of sulfur trioxide are required for each part of glacial acetic acid to produce monosulfoacetic acid. On the same basis for acetic anhydride 1.57 parts are required. For the preparation of a trisulfonic acid, these figures should be multiplied by three (that is, assuming a 100% conversion). In Examples II and III less than the theoretical amount of sulfur trioxide has been employed because a catalyst composed entirely of a trisulfonic acid is not desired. For instance, in Example II, by proper selection of time and temperature 15% methane trisulfonic acid has been obtained with 2.4 parts of sulfur trioxide per part of acetic anhydride (assuming 65% oleum=65% $SO_3$ and 35% sulfuric=28.3% $SO_3$).

In résumé, it will be seen that by virtue of the present invention higher yields of vinyl and ethylidene esters are obtained. Their formation takes place more rapidly in the absorption interaction of acetylene and the liquid aliphatic carboxylic acid. Less tar and less by-products are formed during the absorption interaction with the result that later separation of the solid material from the reaction liquid is considerably facilitated. On the basis of the total sulfo group present, because of the more powerful catalytic influence, less of the trisulfonic acid (or mixtures thereof) need to be used than in the case of sulfoacetic acid or methionic acid (or mixtures thereof). Consequently, less vinyl sulfo esters are apparently formed and fewer complications are encountered during the subsequent purifications. These advantages are also found in the processes of using the vinyl and ethylidene esters.

As many apparently widely different embodiments of this invention may be made without departing from the spirit and scope thereof, it is to be understood that I do not limit myself to the specific embodiments thereof except as defined in the appended claims.

I claim:

1. The process of forming esters which comprises reacting acetylene with lower aliphatic carboxylic acid in the presence of catalytic proportions of methane trisulfonic acid.

2. The process of preparing ethylidene diacetate which comprises reacting acetylene with acetic acid in the presence of a mercury compound and methane trisulfonic acid.

3. The process of preparing vinyl acetate and ethylidene diacetate from acetylene which comprises treating acetylene with acetic acid in the presence of 0.1% to 1% of sulfonic acid catalyst together with a mercury compound, said sulfonic acid catalyst comprising essentially 5%–30% methane trisulfonic acid, 10%–30% methane disulfonic (methionic) acid and 40%–65% sulfoacetic acid.

4. The process of claim 1 when the temperature during the reaction is 40°–110° C.

5. The process of claim 3 when the initial and major part of the absorption of acetylene is carried out at 70°–75° C. and later stages of the reaction are carried out at 90°–95° C.

6. The process which comprises mixing 400 parts of acetic anhydride with 1,070 parts of 65% oleum so that the temperature gradually rises to about 115° C. by the time 450 parts of the oleum have been mixed with the acetic anhydride, allowing the temperature to rise to 120° C. by the time all the materials have been mixed, and maintaining this temperature until the reaction is completed to the desired extent, mixing with 500 parts of glacial acetic acid, maintaining the temperature at about 120° C. for about three hours, mixing with an additional 3000 parts of glacial acetic acid, agitating for about 30 minutes, and thereafter catalyzing an acetylene aliphatic acid absorption interaction with the reaction product.

7. In the production of vinyl acetate from acetylene, the steps of conducting the acetylene absorption in acetic acid in the presence of a mercury compound and methane trisulfonic acid.

8. A catalytic mixture comprising the sulfonic acid mixture of claim 7 together with a mercury salt.

9. The process of claim 2 when the temperature during the reaction is 40°–110° C.

10. The process of claim 3 when the temperature during the reaction is 40°–110° C.

11. The process which comprises mixing 400 parts of acetic anhydride with 1070 parts of 65% oleum so that the temperature gradually rises to about 115° C. by the time 450 parts of the oleum have been mixed with the acetic anhydride, allowing the temperature to rise to 120° C. by the time all the materials have been mixed, and maintaining this temperature until the reaction is completed to the desired extent, mixing with 500 parts of glacial acetic acid, maintaining the temperature at about 120° C. for about three hours, mixing with an additional 3000 parts of glacial acetic acid, agitating for about 30 minutes, mixing 38 parts of the resultant with 21 parts of reactive mercuric sulfate, 14 parts of mercuric oxide and 5600 parts of glacial acetic acid containing sufficient acetic anhydride to keep the mixture anhydrous, and maintaining the aforementioned mixture at a temperature of 80°–100° C. while passing in acetylene as rapidly as it is absorbed until there is a sharp drop in the rate of absorption.

JOSEPH G. DINWIDDIE.